Figure 8:
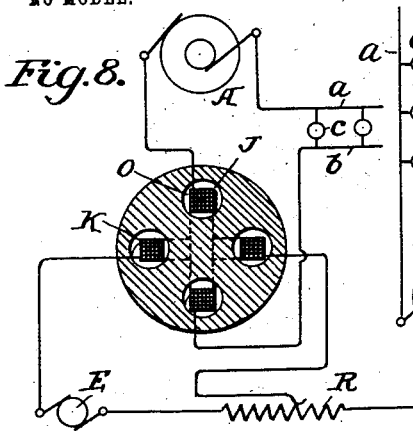

No. 720,884. PATENTED FEB. 17, 1903.
C. F. BURGESS & B. FRANKENFIELD.
REGULATION OF ELECTRIC CIRCUITS.
APPLICATION FILED JUNE 12, 1901.
NO MODEL. 2 SHEETS—SHEET 1.
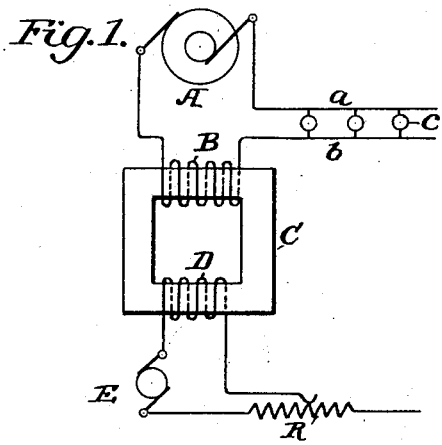
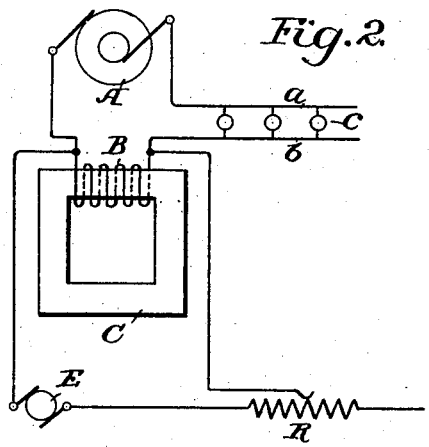
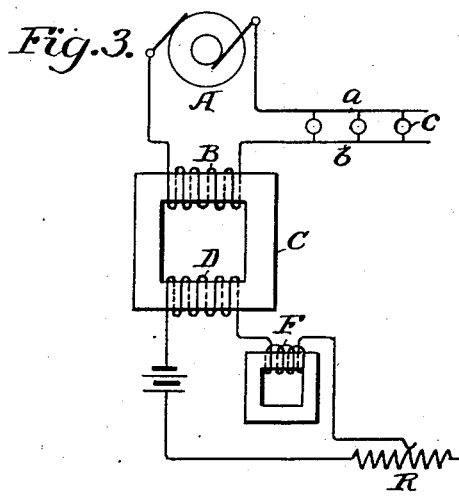
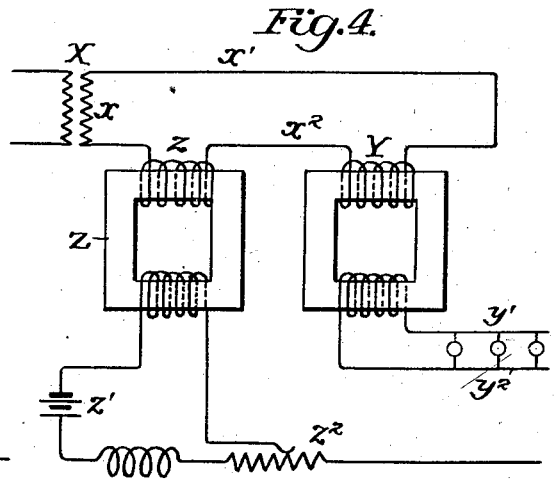
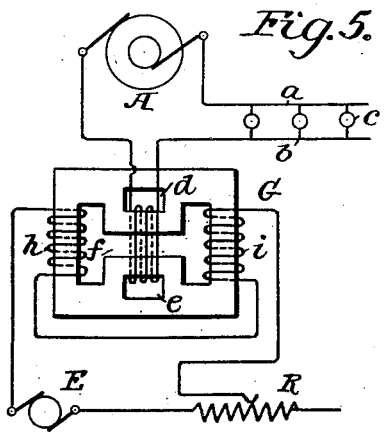
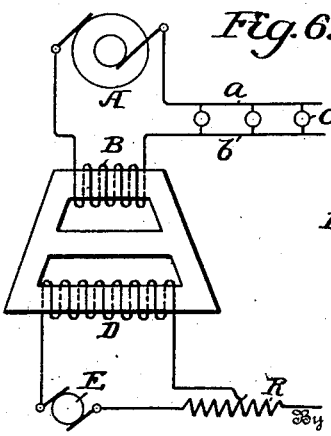
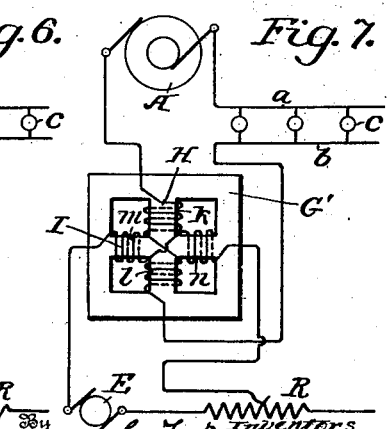

No. 720,884. PATENTED FEB. 17, 1903.
C. F. BURGESS & B. FRANKENFIELD.
REGULATION OF ELECTRIC CIRCUITS.
APPLICATION FILED JUNE 12, 1901.
NO MODEL. 2 SHEETS—SHEET 2.

Witnesses
J. G. Hinkel
Inventors
C. F. Burgess,
B. Frankenfield.
By
Attorneys

UNITED STATES PATENT OFFICE.

CHARLES F. BURGESS AND BUDD FRANKENFIELD, OF MADISON, WISCONSIN.

REGULATION OF ELECTRIC CIRCUITS.

SPECIFICATION forming part of Letters Patent No. 720,884, dated February 17, 1903.

Application filed June 12, 1901. Serial No. 64,323. (No model.)

*To all whom it may concern:*

Be it known that we, CHARLES F. BURGESS and BUDD FRANKENFIELD, citizens of the United States, residing at Madison, in the county of Dane and State of Wisconsin, have invented certain new and useful Improvements in the Regulation of Electric Circuits, of which the following is a specification.

Our invention relates to a method of regulating electric circuits and systems of distribution, but more particularly to a method of regulating and controlling alternating-current circuits.

The object of the invention is to provide a method of regulating and controlling the current and potential in an electric circuit or system of circuits whereby the use of heavy movable parts and expensive apparatus is avoided and simple and effective means are provided in place thereof and smooth and uniform variations in the circuit are obtained for the purposes of regulation without the use of a multiplicity of contacts carrying load-currents.

Our method of regulation for electric circuits depends upon the principle of variable inductance. In an alternating-current circuit containing inductance, for instance, a decrease in the inductance will allow an increase in the current generated by the prime mover and available for the load, while an increase in inductance decreases the current available in the circuit.

Our invention therefore consists in a novel method of varying the inductance in an electric circuit for regulating the current and potential thereof, such circuit including an inductive resistance, as a coil of wire wound upon a core of paramagnetic material, as soft iron.

We have found that if the core of an inductive resistance, as a choke-coil, be initially and independently magnetized, as by a direct current through a winding upon the core, then the inductance of the coil will vary inversely with the amount of direct magnetization, any increase in the direct magnetization decreasing the inductance, and vice versa, and by including the inductive resistance of such a device as above described in the electric circuit to be controlled regulation may then be effected by varying the amount of direct magnetization. The resultant inductance in such a case is therefore due to the result of independent magnetizations of different characters, one superposed upon the other. It is not necessary that such magnetizations should be in the same linear direction—as, for instance, the direct magnetization may be produced at any angle to the alternating magnetization or parallel thereto. Inductance in the coil will still vary inversely with the amount of direct magnetization.

Our invention is illustrated in the accompanying drawings, in which—

Figure 9:
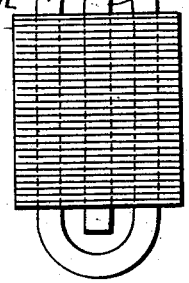
Figure 10:
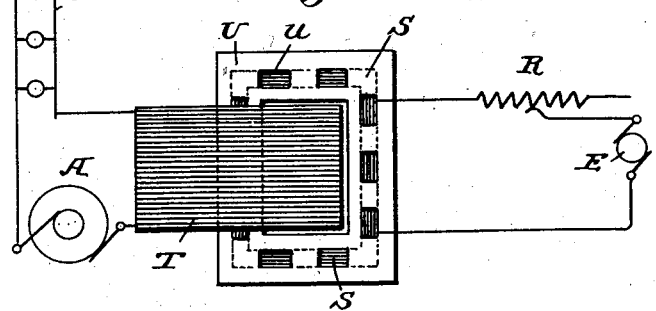
Figure 11:
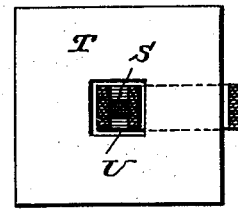
Figure 12:
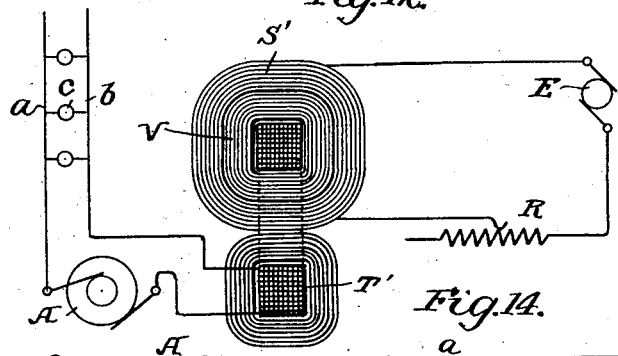
Figure 13:
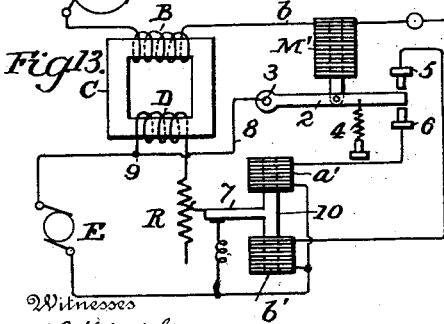
Figure 14:
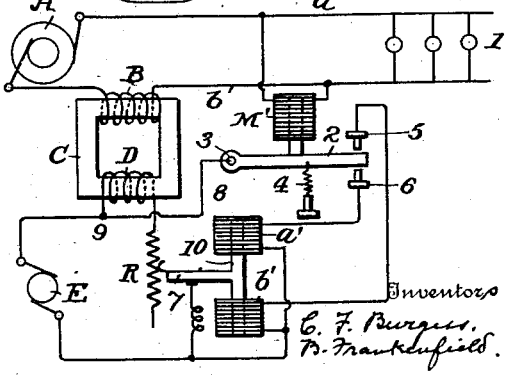

Figure 1 is a diagrammatic representation of an inductance-coil used with our method of regulation, the regulating means being shown out of proportion to the electric circuit for purposes of clearness. Fig. 2 is a diagrammatic representation of an inductance-coil having but one winding for both alternating and direct current. Fig. 3 is a diagrammatic representation of apparatus for utilizing our method of regulation, wherein an additional choke-coil is shown to prevent an excessive flow of alternating current due to transformer action in the direct-current exciting-coil. Fig. 4 is a diagrammatic representation of circuits embodying apparatus for using our method of regulation. Figs. 5 and 6 represent circuits embodying apparatus for minimizing induced alternating electromotive force in the direct-current coil. Fig. 7 shows an arrangement of circuits for minimizing such action by means of transverse magnetization in the core of the inductance-coil. Fig. 8 shows another arrangement for doing the same in which the inductance-coil is placed in a plane at right angles to the plane of the direct-current coil. Fig. 9 is a plan of the core and coils of Fig. 8. Fig. 10 shows another arrangement for reducing induced alternating electromotive force in a direct-current circuit in which the direct-current coil links the inductance-coil; Fig. 11, a plan of the core and coils of Fig. 10, partly in section. Fig. 12 is a section of a modification of Figs. 10 and 11, in which the inductance-coil is placed inside of the direct-current coil. Fig. 13 is a diagrammatic representation of an automatic system of regulation utilizing our method for a constant-current circuit, and Fig. 14 is a diagrammatic representation of an automatic system of regulation for a constant-potential circuit.

Referring to the drawings, in Fig. 1, A represents a source of electric energy, (shown as a generator for alternating electric currents,) while $a$ and $b$ are mains leading therefrom, in which there are suitable electroreceptive devices, as lamps $c$. A suitable inductance is introduced within the circuit of the mains $a$ $b$, shown as an inductive resistance B, wound upon a core C, of paramagnetic material, preferably soft iron. Also wound upon the core C is shown a coil D, the circuit of which includes a variable resistance R, and a suitable source of direct current E, (shown as a generator;) but the same could be a battery or storage battery. This figure is merely illustrative of the principle on which our system of regulation operates, and it will be seen that the core C may be initially magnetized by direct current by means of the coil D, while the inductance, due to the coil B, will therefore vary with variations in the direct-current magnetization, such variations being provided for by means of the resistance R. The total magnetic induction is due to the magnetizations produced by the coils B and D, the former an alternating magnetization and the latter a direct magnetization.

It is not necessary that there should be two coils, one for alternating and one for direct current, and in Fig. 2 we have shown an arrangement whereby the coil B on the core C receives both alternating and direct current, and alternating and direct magnetizations are set up in the core. Variations in the direct magnetization will cause variations in the inductance of coil B, and this arrangement will also serve for regulation of the current in the mains $a$ $b$.

Where the source of direct current is a dynamo with a large inductance in its armature-winding, the coils for direct magnetization on the core C may be so proportioned as to give a small enough alternating voltage, due to the transformer action in the coil C, so that but little alternating current will flow in the direct-current circuit; but in using a battery or storage battery as the source of direct current it is necessary to provide some means, as a choking-coil F, (shown in Fig. 3,) to prevent an excessive alternating current in the direct-current circuit. Other means may also be provided for preventing this undesirable action, as the direct current reduces the inductance of the auxiliary choking-coil. Therefore the main inductance-coil B may be so wound as to permit only a small portion of the alternating magnetic flux to thread the direct-current coil. Figs. 5 and 6 represent means for accomplishing this result. In Fig. 5 the core G has an air-gap $f$, and the alternating-current and direct-current coils are so wound upon it that but little of the alternating magnetization threads the direct-current coil, thus minimizing the induced alternating electromotive force in the direct-current coil. In the case of Fig. 5 two coils $h$ and $i$ are shown connected to the direct-current source. In Fig. 6 the fields produced by the coils B and D are substantially parallel to each other in linear direction; but the windows in the core are so arranged that only a small portion of alternating magnetic flux threads the direct-current coil.

Fig. 7 shows yet another way of arranging the magnetic circuit and windings thereon to accomplish the same result. The coil H, containing the alternating current, is wound upon the two arms $k$ $l$ of the core G', while the coil I, containing the direct current, is wound upon the two arms $m$ $n$ in such manner that the magnetization produced by one of said coils is substantially at right angles to the magnetization produced by the other of said coils, and transformer action in the direct-current coil is reduced.

Fig. 8 shows in sectional elevation an arrangement of core and coils whereby the inductance-coil J, through which the alternating current flows, is placed inside the direct-current coil K. The plane of the coil J is shown as being substantially at an angle of ninety degrees to the plane of the coil K; but it is to be understood that this angle could be any angle, and still the desired results as to regulation would be produced without, however, minimizing to so great a degree the induced pressure in the direct-current winding.

In Figs. 10 and 11 the direct-current coil S is shown linking the inductance-coil T and embedded in the laminated core U, with staggered ventilating-ports $u$ on each side; but either coil S or T may be used as the direct-current coil and the other as the inductance-coil. The inductance-coil T, as shown, is so wound as to have a longitudinal magnetic circuit with reference to the laminations of the core U.

Fig. 12 is a modification of Fig. 10, in which S' is the direct-current coil, while T' is the inductance-coil, and V is an iron-ribbon core between the two.

Referring to Fig. 4, a diagram of circuits is shown, in which X represents a transformer at the power-station, the secondary $x$ of which is included in the circuit of the mains $x'$ $x^2$. Y represents a distributing-transformer, with primary in circuit with $x'$ $x^2$ and secondary in circuit with the leads $y'$ $y^2$, including a suitable load. An inductive resistance $z$ is shown included in the circuit of the mains $x'$ $x^2$, wound upon a core Z, which core is initially magnetized by direct current from the source $z'$. A variable resistance is shown at $z^2$ for varying the direct-current circuit, and consequently the direct magnetization.

In Fig. 13 our method of regulation is shown applied to a constant-current circuit, and apparatus is shown for automatic regulation. A represents a suitable source of alternating currents, as before, while $a$ and $b$ are mains leading therefrom and including a suitable load, as lamps 1. Also included in the circuit of the mains $a\ b$ is an electromagnet M' and an inductive resistance B, the latter wound upon a core of paramagnetic material, as soft iron C. The magnet M' is adapted when energized above normal to raise a contact-arm 2, pivoted at 3, which arm is retracted by a suitable spring 4 when the attraction of the magnet falls to normal or below. The arm 2 makes contact with either one of the stops 5 and 6 and normally remains half-way between them at normal current. Also wound upon the core C is a coil D, connected to the source of direct current E, the variable resistance R being included in the circuit of the source and coil. The arm 7, adapted to pass or slide over the contacts of resistance R, is operated by means of suitable electromagnets $a'\ b'$, energized by direct current from the source E.

The operation of the apparatus is as follows: If the load on the mains $a\ b$ is increased, the current falls, electromagnet M' becomes weakened, and arm 2, which has rested normally between the contacts 5 6, is pulled against the lower stop 6 by spring 4. A circuit is then completed through the stop or contact 6, arm 2, wire 8, to the point 9, through source E, to and through magnet $a'$, and back to contact 6. Magnet $a'$ attracts the armature 10 and moves arm 7 to cut out more or less of the resistance R, thus increasing the current in coil D, thus increasing the amount of direct magnetization in the core C and decreasing the inductance in coil B, so that more current is allowed to flow in mains $a\ b$, and the current therein is brought back to normal, whereupon arm 2 resumes its normal position between contacts 5 and 6. Upon a decrease in load magnet M' becomes more strongly energized and arm 2 makes contact with stop or contact 5, when a circuit is completed through magnet $b'$, resistance at R is cut in, the amount of direct magnetization set up by coil D is reduced, the inductance in coil B is increased, and less current is allowed to flow in the mains $a\ b$, bringing the circuit back to normal, whereupon arm 2 resumes its normal position.

In Fig. 14 an arrangement of circuits and apparatus is shown for the automatic regulation of a constant-potential circuit, using our method of regulation. In this case the electric circuits and connections are the same as in Fig. 13, except that the magnet M' is across the mains $a\ b$ instead of in series with them. If the potential on the circuit falls by reason of an increase of load, the magnet M' becomes weakened, magnet $a'$ is thrown into the circuit of the source of direct current E, resistance at R is cut out, the direct magnetization in the core C is increased, the inductance in coil B is reduced, and the potential on mains $a\ b$ again rises. If the load on mains $a\ b$ is decreased, the magnet M' becomes strengthened, due to the consequent rise in voltage, magnet $b'$ is energized, resistance is cut in at R, the amount of direct magnetization in core C is decreased, the inductance in coil B is increased, and the potential on $a\ b$ is brought back.

In constant-pressure working it is usually desirable to so arrange the coils on the core that the magnetic circuit for the alternating-current coil is longitudinal with reference to the laminations of the core, as illustrated in Figs. 10 and 11, while in constant-current working it is often advantageous to have the magnetic circuit for the alternating-current winding so arranged that the alternating magnetization must pass across the spaces between the laminations. In the first case the component of alternating current necessary to magnetize the core, known as the "wattless" component, is relatively low and the power factor of the system relatively high. In the second case the apparatus may be so proportioned that on short circuit or at any particular load normal current only will flow without the use of direct current in the direct-current-exciting coil. It will thus be seen that our broad method of regulation may be carried out in all the arrangements of circuits and apparatus herein described, and the method may also be carried out by arrangements which may suggest themselves to others skilled in the art to which our invention pertains, and we do not wish to be understood as limiting ourselves to the arrangement of circuits and apparatus therefor herein particularly set forth.

Our method of regulating an electric circuit consists, broadly, in including in the circuit the resultant inductance due to independent magnetizations, preferably of the same core of paramagnetic material, such inductance being due to independent magnetizations of different characters, as alternating and direct, one or the other of which may be varied in amount, and these independent magnetizations may be arranged in various relations to each other, as at different angles, to produce the desired effects.

What we claim is—

1. The method herein described of regulating an electric circuit, which consists in including, within the circuit, the resultant inductance due to alternating and direct magnetizations.

2. The method herein described of regulating an electric circuit, which consists in including, within the circuit, the resultant inductance due to independent magnetizations of different characters, and varying the amount of one of the magnetizations.

3. The method herein described of regulating an electric circuit, which consists in including, within the circuit, the resultant inductance due to alternating and direct magnetizations, and varying the amount of direct magnetization.

4. The method herein described of regulating an alternating-current electric circuit, which consists in including, within the circuit, inductive resistance containing iron in its magnetic circuit initially magnetized by direct current.

5. The method herein described of regulating an alternating-current electric circuit, which consists in including, within the circuit, inductive resistance containing initially-magnetized iron in its magnetic circuit, and varying the amount of initial magnetization.

6. The method herein described of regulating an alternating-current electric circuit, which consists in including, within the circuit, inductive resistance containing iron in its magnetic circuit initially magnetized by direct current, and varying the amount of the direct magnetization.

7. The method herein described of varying the inductance of a coil containing iron in its magnetic circuit, which consists in initially magnetizing the said iron, and varying the amount of such initial magnetization.

8. The method herein described of varying the inductance of a coil containing iron in its magnetic circuit, which consists in initially magnetizing the said iron by direct current, and varying the amount of such initial direct magnetization.

In testimony whereof we have signed our names to this specification in the presence of two subscribing witnesses.

CHARLES F. BURGESS.
BUDD FRANKENFIELD.

Witnesses:
FANNIE G. SANFORD,
W. D. HIESTAND.